United States Patent [19]

Horsma et al.

[11] 4,236,949
[45] Dec. 2, 1980

[54] PROCESS FOR PREPARING A HERMETICALLY SEALED ASSEMBLY

[75] Inventors: David A. Horsma, Palo Alto; Stephen H. Diaz, Los Altos, both of Calif.

[73] Assignee: Raychem Corporation, Menlo Park, Calif.

[21] Appl. No.: 945,427

[22] Filed: Sep. 25, 1978

Related U.S. Application Data

[63] Continuation of Ser. No. 717,696, Aug. 25, 1976, abandoned.

[30] Foreign Application Priority Data

Aug. 27, 1975 [GB] United Kingdom ............... 35338/75

[51] Int. Cl.² ........................................... H02G 15/08
[52] U.S. Cl. ......................................... 156/49; 73/52; 73/420; 116/70; 116/112; 138/99; 156/64; 156/86; 156/378; 264/40.1; 264/80; 264/230; 264/342 R
[58] Field of Search ................. 156/49, 51, 64, 84–87, 156/145–147, 156, 285, 286, 287, 296, 303.1, 358, 360, 378; 138/99, 168, 21, 22, 84; 73/52, 262, 410, 406, 409, 410, 420; 264/40, 80, 100, 230, 342 R; 116/65, 70, 112, 114 P

[56] References Cited

U.S. PATENT DOCUMENTS

| 2,027,962 | 1/1936 | Currie | 138/99 |
|---|---|---|---|
| 2,062,435 | 12/1936 | Weiland | 116/114 P |
| 2,370,958 | 3/1945 | Hellier | 156/87 |
| 2,429,121 | 10/1947 | Crowley | 156/87 |
| 2,545,243 | 3/1951 | Rumsey | 156/86 |
| 2,568,129 | 9/1951 | Morris | 156/64 |
| 3,023,607 | 3/1962 | Bolch et al. | 116/114 P |
| 3,086,242 | 4/1963 | Cook et al. | 138/99 |
| 3,174,851 | 3/1965 | Buehler | 75/170 |
| 3,178,944 | 4/1965 | Templeton | 73/420 |
| 3,243,211 | 3/1966 | Wetmore | 287/78 |
| 3,297,819 | 1/1967 | Wetmore | 156/48 |
| 3,351,436 | 11/1967 | Rozner et al. | 75/170 |
| 3,379,218 | 4/1968 | Conde | 138/99 |
| 3,400,028 | 9/1968 | Wilkholm | 156/64 |
| 3,426,719 | 2/1969 | Chapman | 156/86 |
| 3,452,708 | 7/1969 | Richardson | 73/146.8 |
| 3,470,046 | 9/1969 | Verdin | 156/86 |
| 3,514,081 | 5/1970 | Cavanaugh et al. | 156/86 |
| 3,717,717 | 2/1973 | Cunningham | 156/49 |
| 3,889,047 | 6/1975 | Carver | 156/51 |
| 4,085,286 | 4/1978 | Horsma et al. | 174/92 |

FOREIGN PATENT DOCUMENTS

| 801235 | 9/1958 | United Kingdom | 73/420 |
|---|---|---|---|
| 944496 | 12/1963 | United Kingdom | 73/420 |
| 1155470 | 6/1969 | United Kingdom . | |
| 1211988 | 11/1970 | United Kingdom . | |
| 1346479 | 2/1974 | United Kingdom . | |

Primary Examiner—John E. Kittle
Attorney, Agent, or Firm—Lyon & Lyon

[57] ABSTRACT

The formation of a hermetic seal in an assembly resulting from the connection or encapsulation of one or more substrates such as cables by one or more dimensionally-recoverable covering members such as heat-recoverable sleeves is checked by detecting the increase in air pressure which occurs during heating of the assembly once a hermetic seal has been made. To this end, a covering member is provided with an aperture which communicates with a detection device such as a balloon or a manometer and with a space within the assembly in which there is a build up of air pressure.

49 Claims, 4 Drawing Figures

PROCESS FOR PREPARING A HERMETICALLY SEALED ASSEMBLY

RELATED APPLICATION

This is a continuation of application Ser. No. 717,696, filed Aug.25, 1976, now abandoned.

Attention is drawn to copending application Ser. No. 943,196 filed Sept. 18, 1978 which is a continuation of Ser. No. 717,695 entitled "Process for preparing a hermetically sealed assembly" having a filing date of Aug. 25, 1976, now abandoned.

BACKGROUND OF THE INVENTION

This invention relates to the covering, e.g. for connection and/or encapsulation purposes, of substrates and, more especially, relates to the formulation of an assembly comprising a substrate and a covering which is hermetically sealed around the substrate. The invention is especially applicable to heat-shrinkable covering articles used in the insulation and connection of, for example, pipelines and electric cables.

Heat-recoverable articles, which have been deformed from an original configuration and which are capable of returning towards that configuration on the application of heat, are well known and are generally made from polymeric materials, especially cross-linked polymeric materials, such, for example, as those described in U.S. Pat. Nos. 2.027,962 and 3,086,242, the disclosures of which are incorporated herein by reference. More recently, heat-recoverable articles have also been made from certain alloys, sometimes called "memory metals", as described, for example, in U.S. Pat. Nos. 3,174,851 and 3,351,463, the disclosures of which are also incorporated herein by reference.

One of the main uses of these heat-recoverable articles, especially when made from polymeric materials such as cross-linked poylethylene, has been in the field of electrical insulation and, more especially, in the connection and encapsulation of electrical conductors such as wires and cables. They have also been extensively used in the insulation and connection of service lines such as pipelines.

In these applications the heat-recoverable article usually in the form of a heat-shrinkable tube or a wrap-around sleeve, as described, for example, in U.S. Pat. Nos. 3,243,211; 3,297,819 and 3,379,218 and British Pat. Nos. 1,155,470; 1,211,988 and 1,346,479, respectively, the disclosures of which are also incorporated herein by reference, is caused to shrink about the substrate(s) being insulated or connected. In most of these applications it is necessary that a good seal is made between the ends of the heat-recoverable article and the substrate as protection against the ingress of moisture and small insects etc.. For this reason the heat-recoverable articles are commonly provided with an inner layer of adhesive or other sealant, e.g. a mastic, at least at their terminal portions. However, even then it is difficult to ensure that a reliable seal is obtained in all cases upon recovery and, more particularly, it is difficult to determine afterwards whether or not a moisture- and insect-proof seal has in fact been obtained.

The formation of a hermetic seal is, of course, also important when other forms of covering are used to connect or encapsulate the substrates. For example dimensionally-recoverable coverings may be employed in which conventional elastomeric recovery is used, including dimensionally-recoverable articles which comprise an elastomeric outer tube which is held in a stretched state by an inner tube which, upon heating, weakens and thus allows the elastomeric outer tube to recover.

In all of the above instances the heating used during formation of the covered assembly leads to a build up of air pressure within the covering (which may in some cases lead to disruption of the seal).

SUMMARY OF THE INVENTION

The present invention provides a process for preparing an assembly comprising a substrate and a covering which is hermetically sealed around the substrate, which process comprises causing at least one dimensionally recoverable covering member to recover and to seal hermetically about the substrate, while heating said covering member, said covering member having at least one open end and an aperture which is remote from said open end and which communicates with the interior of the assembly and with a detection device which detects increased air pressure in the interior of the assembly, whereby formation of the hermetic seal is signalled by said detection device.

The present invention also provides apparatus comprising a dimensionally recoverable covering member having at least one open end and an aperture remote from said end, and a detection device for attachment to said aperture for detecting increased air pressure.

The covering member used in the present invention is dimensionally recoverable, preferably heat-recoverable, and will usually be of generally tubular form with at least one open end, e.g. a heat-shrinkable end cap for the termination of cables, or, more commonly, two open ends, e.g. a heat-shrinkable tube for the connection of wires and cables (the term "generally tubular" as used herein including, for example, tubes of circular and non-circular cross-section as well as Y-shaped, T-shaped and X-shaped members). These covering members are generally provided with a lining of an adhesive or a mastic, at least in the regions, e.g. their terminal portions, where the hermetic seal is formed. There may, of course, be more than one covering member used in a specific application, but, for convenience, the invention will be described in terms of the use of a single covering member.

In practice the covering member is placed in position about the substrate(s) to which it is to be hermetically sealed during the formation of the connected or encapsulated assembly. It is then heated, usually initially at the end(s), to actuate any adhesive or mastic lining and/or to cause it to recover. The air pressure inside the covering member builds up by this heating and may be further increased by dimensional recovery of the covering member. Initially some air escapes via the open end(s) of the covering member but when a hermetic seal is made it can no longer escape in this way.

In accordance with the present invention this build-up of air pressure within a space which is initially open to the atmosphere but which is closed when a hermetic seal is made is detected by the use of a suitable detection device which communicates with said space via the aperture in the covering member. By this means, not only can the build-up of increased air pressure be detected and monitored, but also the air pressure can be relieved once a hermetic seal has been made thus allowing full dimensional recovery and/or obviating subsequent damage to the seal by prolonged pressure from air trapped within the covering.

The aperture which communicates with the space in which increased air pressure is detected and with the detection device and may be provided with means for the attachment and detachment of the device. Said means may comprise, for example, a screw-threaded or bayonet-type fitting within the aperture or on a valve fitted within the aperture.

In another embodiment, the detection device may be provided with a sharp probe, e.g. a needle, which can make such an aperture.

The detection device may employ any method of detection but it will, in general, be unnecessary and inappropriate to employ sophisticated apparatus. Amongst simple detection devices which may be employed there may be mentioned, for example, a bag or balloon which will inflate as it communicates with the pressurized air a whistle or a manometer. In most applications it will be preferred if the device can be detached after use and, in this respect, it will obviously be preferable if it can be reused. However, this can readily be achieved by conventional attachment and detachment means, for example, screw-threaded or bayonet-type fitting, as described above, either to the covering member itself or to a replaceable probe.

Once a hermetic seal has been made the detection device or the probe may be removed and, if necessary, the aperture may be patched to maintain the hermetic seal. Alternatively, the probe may itself be made from a material which can be melted, crushed or otherwise deformed to maintain the hermetic seal after use. A meltable plastics probe, e.g. made from nylon, is especially useful in this respect.

In some applications of the present invention it may be appropriate deliberately to form the space in which increased air pressure is to be detected by suitably shaping the covering member and/or the substrate. For example, one closure device to which the present invention is especially applicable is a "splice case" as described and claimed in our U.S. application Ser. No. 509,837, filed Sept. 27, 1974 now abandoned and our U.S. Continuation in-Part application No. 601,344 filed Aug. 4, 1975 now U.S. Pat. No. 4,085,286. In this "splice case" the covering member is a closure article comprising first and second members adapted to be brought together to form a generally tubular structure having a central cavity portion, the first member being heat-recoverable and the second member being non-heat-recoverable, and provided with means for maintaining said members together during heat-recovery of said first member, the structure so formed being adapted at at least one end thereof to heat-recover around and seal a plurality of cables inserted therein. In a preferred embodiment, the central cavity portion has positioned therein a rigid, dimensionally stable container member for surrounding a splice. Especially when such a splice case is used for the connection of pressurized cables it may be advantageous to create such an artifical space for detection purposes. This may be done, for example, by shaping the rigid container member, for example by providing it with a peripheral groove.

BRIEF DESCRIPTION OF THE DRAWINGS

Various embodiments of the present invention will now be described, by way of example only, with reference to the accompanying drawings, in which

In FIG. 1 there is shown a heat-shrinkable tubular sleeve 1 positioned about two cables 2 and 3 which have been spliced together, the splice being protected in a conventional manner by wrapped tape insulation 4. The heat-shrinkable tubular sleeve is provided at its ends with an inner coating of a mastic 5 and in its central region is provided with an aperture in which a tubular insert 6 is positioned. An inflatable balloon 7 is attached to the insert 6.

FIG. 2 shows the position after heating and partial recovery. It will be seen that the ends of the heat-shrinkable tubular member 1 have shrunk down over the cables 2 and 3 and a seal has been formed in these regions with the result that the air pressure in the space 8 has increased due to the heating and the partial recovery of tubular member 1 and air has thus been forced through the aperture and has partially inflated the balloon 7.

FIG. 3 shows the position after complete recovery. The heat-shrinkable tubular sleeve 1 has now fully recovered about the joint between cables 2 and 3 and the air which has been forced out by heating and by this recovery has fully inflated the balloon 7. It will be appreciated that had the seals formed at the ends of the heat-shrinkable sleeve 1 been unsatisfactory the balloon 7 would not have been inflated.

After complete recovery the balloon can be removed and the aperture can be closed in any conventional manner, more particularly by mechanically crushing the insert 6 to provide a closure.

Figure 1:
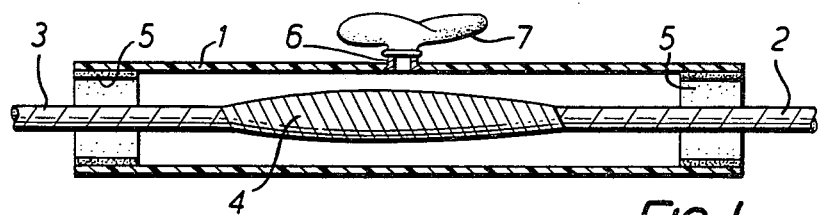
FIG. 1 shows a heat-shrinkable article positioned about a cable joint.
Figure 2:
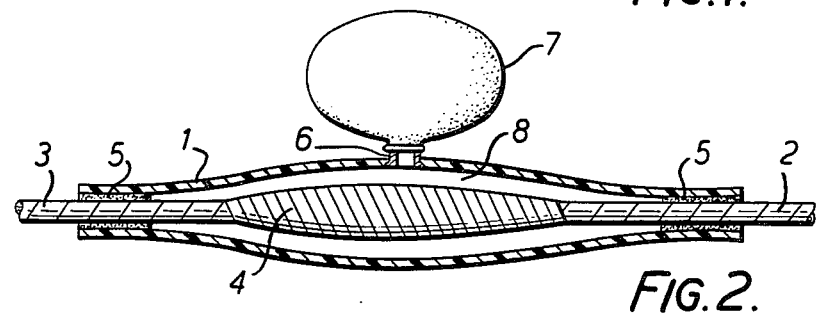
FIG. 2 shows the heat-shrinkable article of FIG. 1 after partial recovery thereof.
Figure 3:
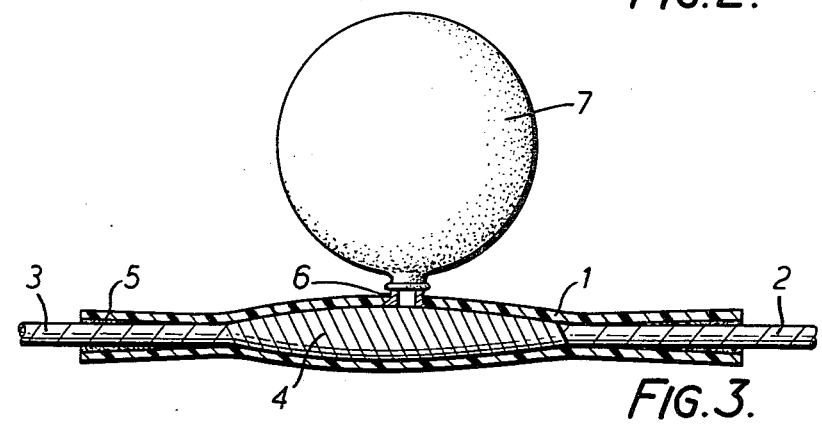
FIG. 3 shows the heat-shrinkable article of FIG. 1 after complete recovery.
Figure 4:
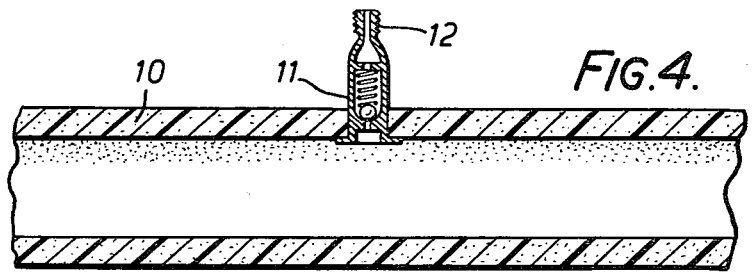
FIG. 4 shows a second form of heat-shrinkable article for use in the present invention.

Turning now to FIG. 4 there is shown a heat-shrinkable tubular sleeve 10 provided with an aperture containing a simple one-way valve 11. As shown, the valve 11 comprises a portion 12 having an externally screw threaded surface to which can be attached, for example, a manometer (not shown) for measuring the amount of air expelled on recovery. If desired the one-way valve can be completely closed after recovery by mechanical crushing in the region of the screw threaded portion 12 or by any other suitable method. It will be appreciated that if mechanical crushing or another form of closure is to be effected then it is not essential that a valve be employed within the aperture.

I claim:

1. A process for preparing an assembly comprising a substrate and a covering which is hermetically sealed around the substrate which process comprises the steps of:
    placing a dimensionally recoverable covering member having at least one open end about the substrate which is sought to be hermetically sealed;
    causing said dimensionally recoverable covering member to recover and to seal hermetically about the substrate;
    detecting increased air pressure in the interior of the assembly between the covering member and substrate at a point which is remote from said open end by the employment of a detection device which communicates with said point whereby the formation of the hermetic seal is signalled by said detection device.

2. The process as claimed in claim 1, wherein said detection device communicates with the interior of the assembly via a probe.

3. A process as claimed in claim 1, wherein said covering member is provided with a lining selected from the group consisting of adhesives and mastics at least in those regions where it forms the hermetic seal to the substrate.

4. A process as claimed in claim 1, wherein said covering member is heat-recoverable.

5. A process as claimed in claim 1, wherein said covering member is generally tubular.

6. A process as claimed in claim 1, wherein the covering member is a closure article comprising first and second members adapted to be brought together to form a generally tubular structure having a central cavity portion, the first member being heat-recoverable and the second member being non-heat-recoverable, and provided with means for maintaining said members together during heat-recovery of said first member, the structure so formed being adapted at at least one end thereof to heat-recover around and seal a plurality of cables inserted therein.

7. A process as claimed in claim 6, wherein the central cavity portion has positioned therein a rigid, dimensionally stable container member for surrounding a splice.

8. A process as claimed in claim 1, wherein said covering member is provided with a valve.

9. A process as claimed in claim 1, wherein said covering member is provided with means for the attachment and detachment of the detection device.

10. A process as claimed in claim 1, wherein the detection is a balloon.

11. A process as claimed in claim 1, wherein the detection device is a whistle.

12. A process as claimed in claim 1, wherein the detection device is a manometer.

13. A process according to claim 1, wherein said dimensionally recoverable covering member is preformed.

14. A process according to claim 1, wherein said hermetic seal is signalled at the time of formation by said detection device.

15. A process as claimed in claim 1, wherein the covering member is an assembly comprised of two or more preformed covering members, at least one of which is at least in part heat-recoverable, and at least one of which has an adhesive or mastic lining at the seal-forming portions thereof, for sealing around the substrate to form a hermetically sealed enclosure, and wherein said detection device detects increased air pressure within said enclosure and provides for relief of excess air pressure therefrom once the hermetic seal has been formed.

16. A process as claimed in claim 1, wherein the covering member is preformed and is at least in part heat-recoverable and has an adhesive or mastic lining at the seal-forming portions thereof for sealing around the substrate to form a hermetically sealed enclosure and wherein said detection device detects increased air pressure within said enclosure and provides for relief of excess air pressure therefrom once the hermetic seal has been formed.

17. The process as claimed in claim 1, wherein said detection device is provided with a sharp probe used to create an aperture in the cover for communication with the interior of the assembly.

18. A process for preparing an assembly comprising a substrate and a covering which is hermetically sealed around the substrate which process comprises the steps of:
  placing a dimensionally recoverable covering member having at least one open end about the substrate which is sought to be hermetically sealed;
  causing said covering member to recover initially at the open end thereof and thereafter uniformly throughout so as to effectuate a hermetic seal about said substrate;
  detecting increased air pressure in the interior of the assembly between the covering member and substrate at a point which is remote from said open end by the employment of a detection device, which communicates with said point whereby the formation of the hermetic seal is signalled by said detection device.

19. The process as claimed in claim 18, wherein said detection device communicates with the interior of the assembly via a probe.

20. A process as claimed in claim 18, wherein said covering member is provided with a lining selected from the group consisting of adhesives and mastics at least in those regions where it forms the hermetic seal to the substrate.

21. A process as claimed in claim 18, wherein said covering member is heat-recoverable.

22. A process as claimed in claim 18, wherein said covering member is generally tubular.

23. A process as claimed in claim 18, wherein the covering member is a closure article comprising first and second members adapted to be brought together to form a generally tubular structure having a central cavity portion, the first member being heat-recoverable and the second member being non-heat-recoverable, and provided with means for maintaining said members together during heat-recovery of said first member, the structure so formed being adapted at at least one end thereof to heat-recover around and seal a plurality of cables inserted therein.

24. The process as claimed in claim 18, wherein said detection device is provided with a sharp probe used to create an aperture in the cover for communication with the interior of the assembly.

25. A process for preparing an assembly comprising a substrate and a covering which is hermetically sealed around the substrate which process comprises:
  heating at least one dimensionally recoverable member having at least one open end thereby causing said covering to recover and seal hermetically about the substrate;
  detecting increased air pressure caused by the recovery of said covering by employing a detection device which communicates via an aperture in the cover with a point remote from said open end in the interior of the assembly, whereby formation of the hermetic seal is signalled by said detection device.

26. A process as claimed in claim 25, wherein said covering member is provided with a lining selected from the group consisting of adhesives and mastics at least in those regions where it forms the hermetic seal to the substrate.

27. A process as claimed in claim 25, wherein said covering member is heat-recoverable.

28. A process as claimed in claim 25, wherein said covering member is generally tubular.

29. A process as claimed in claim 25, wherein the covering member is a closure article comprising first and second members adapted to be brought together to form a generally tubular structure having a central cavity portion, the first member being a heat-recoverable and the second member being non-heat-recoverable, and provided with means for maintaining said members together during heat-recovery of said first member, the structure so formed being adapted at at least one end of thereof to heat-recover around and seal a purality of cables inserted therein.

30. A process as claimed in claim 29, wherein the central cavity portion has positioned therein a rigid, dimensionally stable container memeber for surrounding a splice.

31. A process as claimed in claim 29, wherein said aperture is provided with a valve.

32. A process as claimed in claim 29, wherein said covering member is provided with means for the attachment and detachment of the detection device.

33. A process as claimed in claim 25, wherein the detection device is provided with a probe which makes the aperture in the covering member.

34. A process as claimed in claim 25, wherein the detection device is a balloon.

35. A process as claimed in claim 25, wherein the detection device is a whistle.

36. A process as claimed in claim 25, wherein the detection device is a manometer.

37. Apparatus for effectuating a hermetic seal around a substrate comprising of a dimensionally recoverable covering member for placement around said substrate, said covering member having at least one open end, and having an aperture removed from said open end, and having a detection device for attachment to said covering member in communication with said aperture for detecting the formation of a hermetic seal around said substrate upon recovery of said covering member 38. Apparatus as claimed in claim 32, wherein said covering member is provided with a lining selected from the group consisting of adhesives and mastics at least in those regions where it forms the hermetic seal to the substrate.

39. Apparatus as claimed in claim 37, wherein said covering member is heat-recoverable.

40. Apparatus as claimed in claim 37, wherein said covering member is generally tubular.

41. Apparatus comprising a closure article having first and second members adapted to be brought together to form a generally tubular structure having a central cavity portion, the first member being heat recoveable and the second member being non-heat recoverable, and provided with means for maintaining said members together during heat recovery of said first member, the structure so formed being adapted at at least one end thereof to heat-recover around and seal a plurality of cables inserted therein, said tubular structure having , on at least one end, an aperture remote from said end and a detection device for attachment to said aperture for detecting increased air pressure, said tubular structure having a lining of an adhesive at least in those regions where it forms the hermetic seal to the substrate.

42. Apparatus as claimed in claim 41, wherein the central cavity portion has positioned therein a rigid, dimensionally stable container member for surrounding a splice.

43. Apparatus as claimed in claim 37, wherein said aperture is provided with a valve.

44. Apparatus as claimed in claim 37, wherein said covering member is provided with means for the attachment and detachment of the detection device.

45. Apparatus as claimed in claim 37, wherein the detection device is provided with a probe which makes the aperture in the covering member.

46. Apparatus as claimed in claim 37, wherein the detection device is a balloon.

47. Apparatus as claimed in claim 37, wherein the detection device is a whistle.

48. Apparatus as claimed in claim 37, wherein the detection device is a manometer.

49. Apparatus as claimed in claim 37, wherein said detection device also provides a mechanism for relief of excess air pressure.

* * * * *